United States Patent Office 2,919,652
Patented Jan. 5, 1960

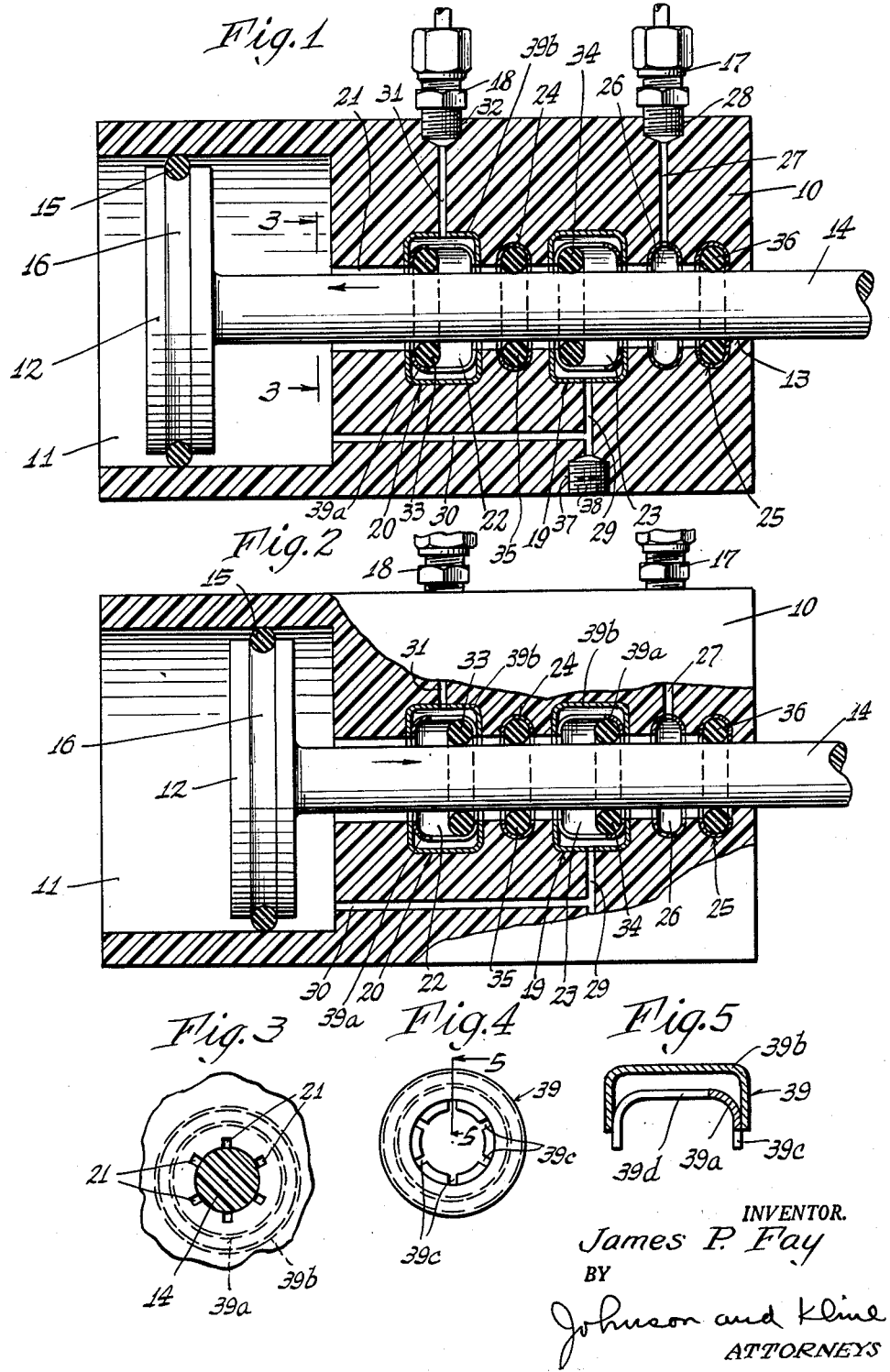

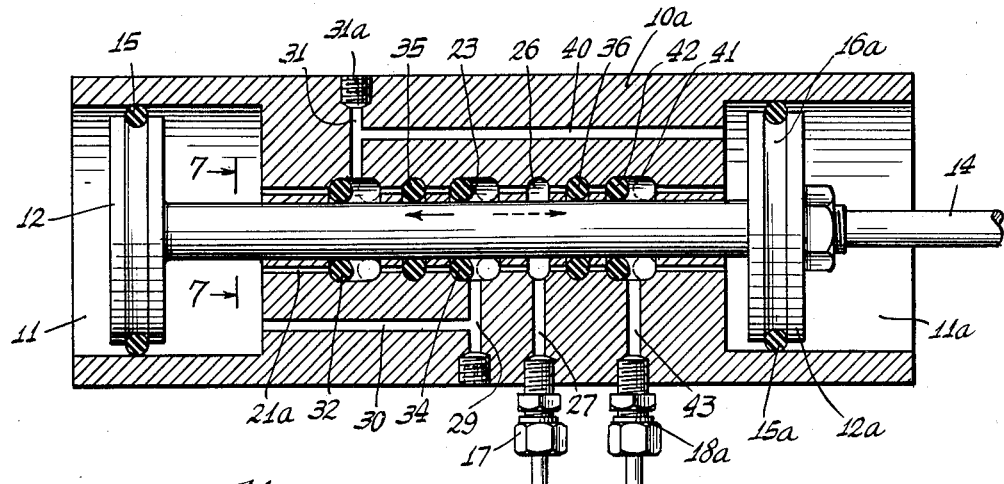
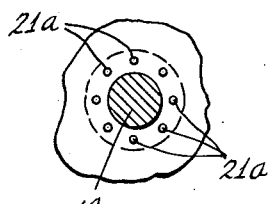
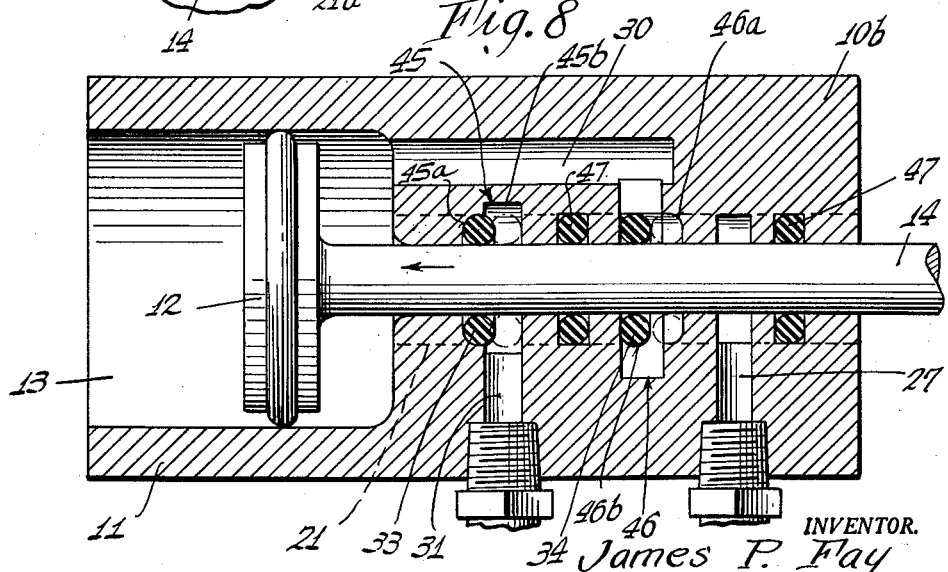

2,919,652

PUMP

James P. Fay, Norwalk, Conn.

Application August 30, 1956, Serial No. 607,157

9 Claims. (Cl. 103—153)

This invention relates to a pump for pumping or compressing fluids.

It is an object of the present invention to provide a pump of simple construction embodying but a few parts which are easy to form and to assemble.

It is another object of the present invention to provide a pump which eliminates the necessity of the use of ball check valves.

This is accomplished by arranging O-ring valve means between the housing for the piston rod and the piston rod for controlling the passages to and from the cylinder, which O-ring valve means are actuated in response to reciprocation of the piston and pump pressures.

A feature of the present pump also resides in the few number of parts since all that is required is a housing, a piston operating in the housing, a plurality of O-rings to form the seals, valve means, and suitable fittings to connect the pump to a device with which it is to be used.

Another feature of the invention resides in the fact that the pump construction lends itself to single stage or multiple stage pumps.

Other features and advantages of the invention will be apparent from the specification and claims when considered in connection with the drawings in which:

Figure 1 is a longitudinal sectional view of the housing with the piston on the intake stroke showing the position of the O-ring seals and valves.

Fig. 2 is a view partly in section of a piston and valve means showing the relation of the valve means on the compression stroke.

Fig. 3 is a fragmentary sectional view taken along lines 3—3 of Fig. 1.

Fig. 4 is a side elevation of a chamber liner.

Fig. 5 is a sectional view taken on line 5—5 of Fig. 4.

Fig. 6 is a view similar to Fig. 1 showing a double stage pump.

Fig. 7 is a fragmentary sectional view taken along lines 7—7 of Fig. 6.

Fig. 8 shows a longitudinal sectional view of another form of housing.

As shown in the drawings, a housing 10 is provided with a piston-receiving cylinder 11 at one end to receive a piston 12 and a bore 13 extending therethrough to slidably receive a piston rod 14 connected to the piston, said piston and piston rod being reciprocated by any suitable means (not shown). The piston is provided with a suitable seal, herein illustrated as an O-ring 15, mounted in a groove 16 in the periphery of the piston and adapted to engage the walls of the cylinder. The housing is provided with passages which extend from an inlet fitting 17 to the cylinder and from the cylinder to an outlet fitting 18 which passages are preferably controlled by O-ring valve means 19, 20. While these passages may be variously located and take various forms, there is herein illustrated a simplified construction wherein the passages include a plurality of grooves 21 in the housing in spaced relation, as shown in Fig. 3, and extending longitudinally of the bore with the grooves opening on the bore. At spaced intervals along the bore and intersecting the grooves there are formed a pair of annular valve-receiving chambers 22, 23, a plurality of sealing recesses 24, 25 and an inlet chamber 26. As shown herein, the inlet chamber is connected by a passage 27 to a threaded opening 28 in which is mounted the inlet fitting 17 adapted to be connected to a suitable source of fluid to be compressed or pumped. The inlet chamber is connected by a portion of the grooves 21 extending along the bore to the inlet O-ring valve chamber 23 with the grooves entering the side wall of the chamber. A passage 29, 30 connects the bottom cylindrical wall of the chamber to the cylinder 11. The grooves 21 connect the cylinder to the outlet valve chamber and an outlet passage 31 enters the bottom wall of the outlet valve chamber 22 and connects the outlet valve chamber to a threaded opening 32 in which is mounted the outlet fitting 18 which is adapted to be connected to a suitable receiver for the pumped fluid.

The valve chambers, as shown in Fig. 1, are adapted to receive the O-rings 33, 34 surrounding the piston rod and are of a width slightly greater than twice the width of the sectional diameter of the O-ring so that they may be displaced from side to side in the valve chamber in response to reciprocation of the piston rod to control the passages. While the pressure in the passages will cause the rings to shift as the piston is reciprocated, it is at present preferred to make the depth of the chamber slightly less than the sectional diameter of the O-ring so that the O-ring sealingly engages the bottom wall and piston rod and is moved by the relative movement between these surfaces.

An O-ring 35 is mounted in the sealing recess 24 located between the two valve chambers and, cooperating with the piston rod seals off the grooves extending therebetween and an O-ring 36 mounted in the sealing recess 25 cooperating with the piston rod seals off the ends of the grooves 21.

As shown in the drawings, the grooves 21 enter the sides of the chambers and the outlet passage 31 and the passage 29 connecting to the cylinder from the inlet valve chamber each leaves from the bottom cylindrical wall of the chamber so that as the piston moves in the direction of the arrow, as shown in Fig. 1, it will cause the O-rings 33, 34 of the valves to be displaced to the left-hand side of the valve chamber. The O-ring 34 opens an inlet passage from the inlet fitting 17 to the inlet chamber 26 along the grooves 21 to the inlet valve chamber 23 through the passages 29, 30 to the cylinder and at the same time O-ring 33 seals off the grooves 21 from the outlet chamber 22. On the compression stroke the initial movement of the piston rod will cause the O-rings 33, 34 to move to the right-hand side of the valve chambers. This causes O-ring 34 to seal off the inlet port from the cylinder and O-ring 33 opens the passage between the outlet port and the cylinder.

It will be seen that the pump of the present invention is of simple design and lends itself to various types of construction. It can be made from metal or plastic materials or combinations thereof as the use of the pump may dictate. The O-rings are formed of an elastomeric material (such as rubber—natural or synthetic—or resilient thermoplastic resins, such as polyethylene, polyamides, vinyl polymers, co-polymers and the like) as determined by the use of the pump.

The housing illustrated in Figs. 1 and 2 is a molded plastic housing. In molding the housing a usual longitudinally split, two-part mold is employed and the outlet passage 31 and opening 32, inlet passage 27 and opening 28 and the passage 29 are formed in the plane of separation of the mold by suitable cores. The outer end of passage 29 is formed with a threaded opening 37 which is closed by a plug 38. The cylinder 11 and the bore 13 in the housing are formed by a suitable core which is provided with ribs or splines to form the longitudinally extending grooves 21 between the housing and the piston rod. Preferably, the valve chambers, the inlet chamber and the sealing chambers are provided with annular metallic liners 39. While these can be made in many ways, they are herein illustrated as being formed by a pair of superposed sheet metal channels 39a, 39b of the proper width. As shown in Figs. 2, 4 and 5, channel 39a has openings 39c in their flanges to receive the splines and the sides of the channel 39b terminate above the openings and the bottom of channel 39b is spaced from the bottom of the channel 39a forming a manifold communicating with the channel 39a through slots 39d and connected to the outlet passage 31. These can be mounted in proper position on the core prior to molding and when the core is withdrawn therefrom will remain in position in the housing. The cylinder-forming core is also provided with an extension to form the inlet passage 30 connecting passage 29 to the cylinder. The piston can be readily molded or otherwise formed.

The device of the present invention can be readily assembled since the O-rings can be inserted into the seals and the O-ring valve chambers and the ring assembled on the piston. The piston is then inserted in the cylinder with the piston rod extending through the bore and O-rings positioned therein and into operative relation therewith. The device is then ready to be connected to a suitable operator for reciprocating the piston in the cylinder.

The pump of the present invention will operate efficiently to pump or compress fluids, i.e., gas or liquid, without requiring the use of ball check valves.

It may be desired to provide a two-stage pump and this is accomplished, as shown in Fig. 6, wherein a housing 10a of the type shown in Fig. 1, is provided with a second cylinder 11a at the opposite end in which a piston 12a is disposed and mounted on the piston rod 14 in any suitable manner, the piston being provided with an O-ring seal 15a mounted on a groove 16a on its periphery. The output passage 31 from the cylinder 11 has its fitting removed and the end of the passage closed by a plug 31a. The passage 31 is connected by a passage 40 to the second cylinder. Also, a third O-ring valve chamber 41 having an O-ring valve 42 is provided adjacent the cylinder 11a and is connected by the passages 21a to the cylinder. An output passage 43 extends from the bottom wall of the chamber to an outlet fitting 18a. In the form of construction shown in Fig. 6, the housing is formed from a block or casting of metal. The passages 21a extending longitudinally through the housing and located adjacent the piston rod, as shown in Fig. 7, are drilled passages as are the inlet and outlet passages 27 and 43 and the communicating passages 29, 30, 31, 40 of the block.

In operation of this form of the invention, as the piston moves to the left, as shown by the full line arrow, the O-ring valves 33, 34 and 42 will be in the position shown in Fig. 6 so that fluid will pass in the inlet passage 27 to the inlet chamber 26 to the inlet valve chamber 23 through passages 29, 30 to the cylinder 11 and the passage 31 will be sealed. The cylinder 11a will be connected through passages 21a and valve chamber 41 to the outlet passage 43. When the piston rod is reversed and moves in the direction of the dotted arrow, the O-ring valves will be shifted to the dotted position at the right side of the valve chambers connecting the cylinder 11 to the cylinder 11a through passages 31 and 40 and closing off the outlet passage 43 and the inlet passage 29 so that the cylinder 11a will be charged with fluid under pressure to be fed to the outlet when the piston rod is reversed and the cycle repeated. Thus, it will be seen that an efficient two-stage pump is provided.

In the form of the invention shown in Fig. 8, the housing 10b having a cylinder 11 and bore 13 to receive the piston 12 and piston rod 14 lends itself well to manufacture on a screw machine wherein the valve chambers 45, 46 and sealing chambers 47 which communicate with the longitudinal passages 21 are formed by suitable cutters operating in the bore 13. The valve chambers 45, 46 are provided with sealing shoulders 45a, 46a which engage the O-ring valves 33, 34 when moved by the movement of the piston rod and/or the pressure in the cylinder and control the longitudinal passages. The valve chambers have enlarged portions 45b, 46b rearwardly of the shoulders to form a manifold for the longitudinal passages connecting with the inlet passage 27 and outlet passage 31. This form of housing, in addition to being inexpensive to manufacture, reduces the wear on the O-ring valves and prolongs their life.

Variations and modifications may be made within the scope of the claims and portions of the improvements may be used without others.

I claim:

1. A pump comprising a housing having a piston-receiving cylinder and a piston rod-receiving bore therein; a piston reciprocatingly mounted in the cylinder and having a piston rod slidable in said bore, said housing having fluid passage means connecting with said cylinder and inlet and outlet passages connecting with said fluid passage means; and O-ring valve means surrounding said piston rod for movement therewith and therealong and cooperating with said passage means for controlling the flow of fluid to and from said cylinder through said inlet and outlet passages in response to reciprocation of said rod in said housing.

2. A pump comprising a housing having a piston-receiving cylinder and a piston rod-receiving bore therein; a piston reciprocatingly mounted in the cylinder and having a piston rod slidable in said bore; axially extending fluid passage means disposed between the housing and piston rod and having one end communicating with said cylinder, said housing having inlet and outlet passages connecting with said axially extending passage means; and O-ring valve means disposed in said axially extending passage means and in engagement with the piston rod and the housing for movement with and along said piston rod for controlling the flow of fluid through said inlet and outlet passages in response to reciprocation of said rod in said housing.

3. A pump comprising a housing having a piston-receiving cylinder and a piston rod-receiving bore therein; a piston reciprocatingly mounted in the cylinder and having a piston rod slidably in said bore, said housing having axially extending grooves forming passage means opening on said bore and forming fluid passages, disposed between the housing and piston rod, having one end communicating with said cylinder, said housing having inlet and outlet passages connecting with said axially extending grooves; and O-ring valve means disposed in said axially extending passage means and in engagement with the piston rod and the housing for controlling the flow of fluid through said inlet and outlet passages in response to reciprocation of said rod in said housing.

4. A pump comprising a housing having a piston-receiving cylinder and a piston rod-receiving bore therein; a piston reciprocatingly mounted in the cylinder and having a piston rod slidable in said bore, said housing having spaced, annular chambers opening on said bore; fluid passage means connecting each of said chambers with said cylinder, said housing having inlet and outlet passages connecting with said chambers; and O-rings mounted on said piston rod and disposed in said chambers for controlling the flow of fluid to and from said cylinder through said inlet and outlet passages in response to reciprocation of said rod in said housing.

5. A pump comprising a housing having a piston-receiving cylinder and a piston rod-receiving bore therein, a piston reciprocatingly mounted in the cylinder and having a piston rod slidable in said bore, said housing having spaced, annular chambers opening on said bore; fluid passage means connecting each of said chambers with said cylinder, said housing having inlet and outlet passages connecting with said chambers; and O-rings mounted on said piston rod and disposed in said chambers, said chambers having a length greater than the sectional diameter of the O-ring whereby said rings are moved in said chambers in response to reciprocation of said rod in said housing to control the flow of fluid to and from said cylinder through said inlet and outlet passages.

6. A pump comprising a housing having a piston-receiving cylinder and a piston rod-receiving bore therein; a piston reciprocatingly mounted in the cylinder and having a piston rod slidable in said bore, said housing having spaced, annular chambers opening on said bore and having a cylindrical bottom wall; fluid passage means connecting each of said chambers with said cylinder, said housing having inlet and outlet passages connecting with said chambers; and O-rings mounted on said piston rod and disposed in said chambers, said chambers having a depth slightly less than and a length greater than the sectional diameter of the O-ring whereby said rings are slightly compressed between the rod and bottom wall of the chamber and are movable laterally in said chambers in response to reciprocation of said rod in said housing to control the flow of fluid to and from said cylinder through said inlet and outlet passages.

7. A pump comprising a housing having a piston-receiving cylinder and a piston rod-receiving bore therein; a piston reciprocatingly mounted in the cylinder and having a piston rod slidable in said bore, said housing having spaced, annular chambers opening on said bore; fluid passage means having a terminal in one wall of and connecting each of said chambers with said cylinder, said housing having inlet and outlet passages connecting with said chambers and having a terminal in an adjacent wall of the chambers; and O-rings mounted on said piston rod and disposed in said chambers in position to cooperate with passages connecting the chambers, said chambers having a length greater than the sectional diameter of the O-ring whereby said rings are moved in said chambers in response to reciprocation of said rod in said housing to and from a position between said passages in the adjacent walls of the chamber to control the flow of fluid to and from said cylinder through said inlet and outlet passages.

8. A pump comprising a housing having a piston-receiving cylinder and a piston rod-receiving bore therein; a piston reciprocatingly mounted in the cylinder and having a piston rod slidable in said bore, said housing having spaced annular chambers opening on the bore; means in said housing including axially extending grooves opening on said bore and intersecting said chambers and forming fluid passages, disposed between the housing and piston rod, having one end communicating with said cylinder, said housing having inlet and outlet passages connecting with said chambers; an O-ring seal mounted in the housing between the chambers and sealing off the axially extending grooves therebetween; and O-ring valve means disposed in said chambers and in engagement with the piston rod and the housing for controlling the flow of fluid through said inlet and outlet passages in response to reciprocation of said rod in said housing.

9. A two-stage pump comprising a housing having a pair of aligned piston-receiving cylinders and a piston rod-receiving bore therein; a piston reciprocatingly mounted in each of the cylinders and a piston rod connected thereto and slidable in said bore, said housing having three spaced annular valve chambers opening on the bore and having O-ring valve means therein; axially extending passages in said housing adjacent said bore and connected to said cylinders and intersecting said chambers, said housing having inlet and outlet passages, each connecting with one of said annular valve chambers; interconnecting passage means connecting the cylinders and including the third annular valve chamber and valve means; and O-ring seals mounted in the housing between the valve chambers and sealing off the axially extending passages therebetween, said O-ring valve means controlling the flow of fluid to and from said cylinders and through said inlet, outlet and interconnecting passages in response to reciprocation of said rod in said housing.

References Cited in the file of this patent

UNITED STATES PATENTS

| | | |
|---|---|---|
| 1,596,037 | Warner | Aug. 17, 1926 |
| 2,313,284 | Valentine | Mar. 9, 1943 |
| 2,614,793 | Storm | Oct. 21, 1952 |